United States Patent Office 2,848,425
Patented Aug. 19, 1958

2,848,425
PREPARATION OF ALKOXYPOLYSILOXANES

Melvin M. Olson and Roger M. Christenson, Milwaukee, Wis., assignors to Pittsburgh Plate Glass Company No Drawing. Application October 7, 1953
Serial No. 384,762

3 Claims. (Cl. 260—2)

This invention relates to methods of forming alkoxy-substituted polysiloxanes and it has particular relation to a method of forming such compounds by simultaneous esterification, hydrolysis, and condensation reactions involving a tetrahalosilane, an alcohol, and a carboxylic acid to provide a polyalkoxypolysiloxane of the general formula:

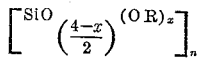

where $x$ is a number which may be fractional and $n$ is an integer. These materials may be open chain, cyclic, or cross-linked in structure depending upon the value of $x$; e. g. where $x=2.5$ the structure may be:

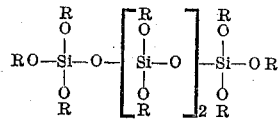

$n$ thus being equal to 4. Where $x=3$, the structure may be:

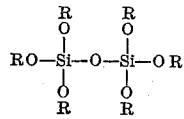

$n$ being equal to 2. Where $x=2$, the structure may be cyclic with no cross-linking and $n$ may be any whole number:

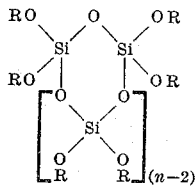

Where $x=\frac{5}{3}$ a plausible structure is:

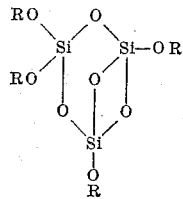

and $n$ is 3

In our copending application, filed on even date herewith and entitled Modifications of Alkyd Resins With Alkoxypolysiloxanes, Serial Number 384,763, it is disclosed that alkoxypolysiloxane bodies containing a plurality of the groups

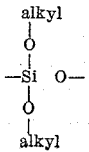

and in which each silicon atom is directly joined to four oxygen atoms constituting bridges between silicon atoms or between silicon atoms and carbon atoms can, by a process of ester interchange be introduced into alkyd resins containing free hydroxyls, with the liberation of a lower alcohol which can be distilled off. This invention includes the provision of a simple and improved method for preparing polyalkoxypolysiloxanes suitable for use in the process of our copending application and for use in various other processes and techniques.

The most general method heretofore available for the preparation of alkoxypolysiloxanes (or esters of polysilicic acid) consists of the partial hydrolysis and concomitant, or subsequent condensation of the intermediate silanols to form siloxanes. This process is represented diagrammically by the following formulae:

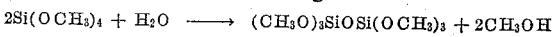

In the foregoing equations the alkoxy groups are assumed to be methyl and the evolved alcohol is methyl alcohol which is eliminated from the system by distillation. The method as illustrated by the foregoing equations is relatively cumbersome, inasmuch as it involves the preliminary conversion of silicon tetrachloride into the corresponding tetralkoxy compound.

Still another previously known method of preparing alkoxypolysiloxanes has comprised preliminary preparation of tetralkoxysilane or alkyl orthosilicate, adding glacial acetic acid to the resultant orthosilicate, apparently, first to form trialkoxysilanol, which condenses to form hexalkoxy disilicate with liberation of water. The water further hydrolizes the starting tetra-alkoxy-silane to form higher polysilicates in accordance with the equations

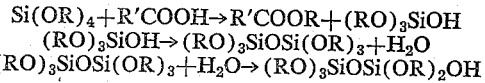

This process is not entirely satisfactory, inasmuch as it involves a two-stage reaction and in at least some cases mixtures of products including orthosilicates, and acetoxy-containing silicates are formed.

The present invention includes the discovery of a simple method whereby tetrahalosilanes such as silicon tetrachloride can be converted in a single step operation to alkoxy polysiloxanes with a minimum formation of undesired byproducts such as sand and with relatively low consumption of starting ingredients. Broadly stated, the invention comprises reacting a silicon tetrahalide such as silicon tetrachloride with an alkyl alcohol in the presence of a substantially anhydrous carboxylic acid such as glacial acetic acid. As a result of the reaction, the halogen atoms of silicon tetrahalide are released as a hydrogen halide which can be swept from the system and the halogen is replaced by alkoxy groups or siloxane links. Simultaneously, esterification occurs between the acetic acid and the alcohol to release water in correct amount and at a correct rate partially to hydrolize the silicon-chloride links, whereby condensation can occur to obtain polysiloxane groupings. The stages of the reaction may be represented by the following equations:

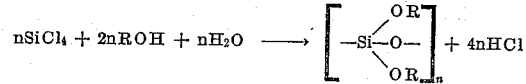

In the reaction enough carboxylic acid and alcohol are employed to provide one mole of water of reaction per mole of silicon tetrachloride. Theoretically, the reaction requires about three moles of the alcohol per mole of the carboxylic acid. These reactants are added slowly to the silicon tetrachloride with continuous stirring. In addition to the foregoing reaction, there is also a tendency for the alcohol and the hydrochloric acid to react to form alkyl halide and water in accordance with the equation $$ROH + HCl \rightarrow RCl + H_2O$$

This side reaction, by reason of the production of water, tends to promote the hydrolysis of the alkoxysiloxane radicals with resultant lowering of the alkoxy content below the theoretical amount. The extent of this side reaction depends upon the nature of the alcohol and is much less pronounced in the normal or straight chain alcohols than in branch chain alcohols. This side reaction can also be controlled by maintenance of a relatively low temperature in the system and by rapidly removing evolved hydrogen chloride, as it is formed, by blowing the mixture with an inert gas such as combustion gases, nitrogen, or the like, from which as much as possible of the moisture has been removed. The effect of this side reaction can be counter balanced by adjusting the proportions of carboxylic acid downwardly. In so doing, it is necessary to increase the amount of alcohol in the system so that enough hydrogen atoms are present for complete removal of the chlorine atoms as hydrogen chloride. If this is not done, chlorine will remain in the alkoxypolysiloxane.

Polyalkoxypolysiloxanes obtained by this method are generally pale yellow, to white liquids of relatively low viscosity. They appear to remain unchanged during storage, a fact which indicates an essentially complete lack of silanol hydroxyl groups in the polysiloxane resin. It has further been demonstrated by saponification of the alkoxypolysiloxanes with sodium hydroxide followed by acidification that there is no appreciable tendency to introduce acetoxy groups into the polysiloxanes.

Polysilicates such as butoxypolysiloxanes prepared by the foregoing method are well adapted for use as modifying agents for oil-modified alkyd resins. For example, an alkoxypolysiloxane such as butoxypolysiloxane prepared by this method can be incorporated with the alkyd resin in the presence of an azeotropic solvent such as xylene or the like, and the mixture can be heated with evolution of alcohol from the alkoxypolysiloxane to effect ester interchange between the alkyd resin and the alkoxypolysiloxane. In this reaction, free hydroxyls of the alkyd resin are involved in the interchange reaction. The reaction requires the use of an alkyd resin which contains an excess of such free hydroxyls.

The foregoing method has also been successfully used for the preparation of allyloxy and methallyloxy-polysiloxanes, and similar unsaturated esters of polysiloxanes. In order to obtain highest possible purity of these unsaturated esters of siloxane it is desirable to keep the reaction temperature near 0° C. during the addition of the acid-alcohol mixture to the silicon tetrahalide. The reaction mixture may then gradually be warmed to a temperature of 70° C. to 80° C. but the temperature should not be allowed substantially to exceed these values until all or almost all of the hydrogen chloride has been evolved. The last traces of hydrogen chloride may be removed by heating the mixture to about 100° C. The efficiency of the reaction is promoted by sweeping out as much of the hydrogen chloride of evolution as possible substantially as quickly as it is formed. This, of course, is accomplished by blowing the mixture with an inert but dried gas such as nitrogen or combustion gases.

The resulting unsaturated polysiloxanes may be polymerized by heating them, preferably in the presence of a free radical catalyst such as benzoyl peroxide or tertiary butyl hydroperoxide. The present invention also includes the use of these unsaturated polysiloxanes as monomers in admixture with alpha-beta ethylenically unsaturated polyesters of glycols, such as the polyesters of maleic acid and diethylene glycol or propylene glycol.

Some of the advantages attending the practice of the present invention have already been commented upon. The more important of these will be summarized as follows: the reaction required the use of substantially less alcohol than is required in some of the conventional processes of forming alkoxypolysiloxanes; the conversion of a silicon tetrahalide into an alkoxypolysiloxane suitable for modifying alkyd resins and for other purposes can be effected as a single, one-step operation merely by interacting the halide and the alcohol in the presence of the carboxylic acid; the water required to effect hydrolysis of the silicon atoms is produced in automatically regulated quantities to obtain optimum results. There is no production of acetoxy groups in the alkoxypolysiloxane compound. Another advantage of the process is that a product which is free of silanol hydroxyl is obtained.

The invention is susceptible of application to the production of polysilicic acid esters of numerous alcohols, particularly the normal, or straight chain alcohols containing 1 to 8 carbon atoms in the molecule and including methyl alcohol, ethyl alcohol, normal propyl alcohol, normal butyl alcohol, normal amyl alcohol, normal hexyl alcohol, normal octyl alcohol and others. These higher alcohols last mentioned tend to be less reactive than the lower alcohols so that longer periods of reaction are required. However, the mode of reaction is similar to that involved with the lower alcohols.

In this reaction, the carboxylic acid does not constitute a component of the polysilicate, but is used merely as a means for forming water in situ, as it is required by the reaction. Glacial acetic acid is, at present, regarded as being the most commercially feasible acid of the type. However the invention also includes the use of other carboxylic acids such as propionic acid, butyric acid and other acids which may be dried and employed as sources of carboxyl groups. Likewise, acrylic and methacrylic acid may be substituted for the foregoing saturated acids. These could form unsaturated acid esters containing $>C=CH_2$ groups as byproducts. These can undergo ethylenic homopolymerizations or can undergo interpolymerizations with other ethylenic compounds in well known manner.

Silicon tetrachloride is preferred as a starting material. However, other halides of silicon such as silicon tetrabromide or silicon tetraiodide are also included within the scope of the invention.

The following examples illustrate a few specific applications of the principles of the invention. They are not to be construed as limiting the invention, however, for there are, of course, numerous possible variations and modifications.

*Example I*

In this example, butoxypolysiloxane was prepared by the interaction of silicon tetrachloride and butyl alcohol. The reaction vessel was a 5-liter, 3-necked, round bottom flask equipped with a rubber sealed stirrer, a reflux condenser and a dropping funnel. The charge comprised 2006.8 grams (11.75 moles) of silicon tetrachloride. The flask was disposed in an ice water cooling bath and a mixture of 2610.7 grams (35.3 moles) of n-butanol which had been dried by distillation and 706 grams (11.75 moles) of glacial acetic acid was added through a dropping funnel over a period of 4 hours. The reaction mixture was rapidly stirred during this addition, as well as during subsequent operations. After the addition was completed, the reaction mixture was allowed to stand overnight, while evolved hydrogen chloride was swept out by passage through the mixture of dried combustion gases. The reaction mixture was then heated on a steam bath for 3½ hours and subsequently it was refluxed for one-half hour. Volatile materials were then distilled off at a pressure of about 10 millimeters (absolute) until a reaction temperature of 115° C. was attained. During this time, 1697.4 grams of distillate, having a hydroxy value in milligrams of potassium hydroxide of 111, and a saponification number (also in milligrams of potassium hydroxide) of 400 were obtained. The residue constituting the desired product, the polysiloxane, weighed 1,885.8 grams and contained 35.7 percent of $SiO_2$ as determined by hydrolysis of a sample with 20 percent hydrochloric acid followed by slow evaporation to dryness and ignition at red heat. It was estimated from the silica content that the butoxy to silicon ratio was 1.66 to 1.

Example II

In this example a 500 milliliter, 3-necked, round bottom flask equipped with a rubber sealed stirrer, a reflux condenser and a dropping funnel, was employed as a reaction vessel. In this vessel was placed 170 grams (1 mole) of silicon tetrachloride and to this was added through the dropping funnel a mixture of 199.9 grams (2.7 moles) of distilled n-butanol and 77.8 grams (1.3 moles) of glacial acetic acid. The addition was made dropwise at a moderately rapid rate and during the addition, the reaction mixture was stirred vigorously. After the addition was complete, the mixture was refluxed for 4½ hours and then volatile materials were removed under reduced pressure of about 10 millimeters (absolute) until a pot temperature of about 150° C. was attained. The distillate obtained, weighed 183.9 grams and the residue weighed 106 grams and had a silicon dioxide content of 48.03, from which it was determined that the butoxyl to silicon ratio was 1 to 1.

Example III

The reaction vessel in this instance, was the same 3-necked, round bottom flask specified in Example II. The charge comprised 175.2 grams (1.03 moles) of silicon tetrachloride to which was added through the dropping funnel a mixture of 141.8 grams (3.08 moles) of absolute ethanol and 61.5 grams (1.02 moles) of glacial acetic acid. The addition was dropwise. The mixture was refluxed for 3½ hours, at the conclusion of which time, the volatile materials were distilled off, leaving 115 grams of a residue having a silicon dioxide content of 52.6 percent. From this, the ratio of ethoxy groups to silicon atoms was calculated as 1.45 to 1. This material as well as other alkoxypolysiloxanes of lower molecular weight alcohols such as methyl, propyl, or butyl, can be employed in the modification of alkyd resins through ester-interchange reactions.

Example IV

The reaction vessel in this example was the same flask and similarly equipped as in Example II. The charge comprised 680 grams (4 moles) of silicon tetrachloride which was added first, after which the flask was disposed in an ice water bath and a mixture of 551.7 grams (12 moles) of absolute ethanol and 240 grams (4 moles) of glacial acetic acid was added over a period of 7 hours. The mixture in the flask was then refluxed for 4½ hours, followed by distillation of volatile materials under reduced pressure. Distillation was continued until a temperature of 125° C. to 130° C. at 10 millimeters (absolute) pressure was attained. The residue in the flask weighed 396.9 grams and had a $SiO_2$ content of 52.8 percent by weight. From this, it was determined that the ethoxy content was 1.45 per silicon atom.

Example V

This example illustrates the preparation of an alkoxypolysiloxane ester of an unsaturated alcohol. The apparatus was the same as in Example II. The charge comprised 170 grams (1 mole) of silicon tetrachloride, which was added first, after which the vessel was disposed in an ice water bath and a mixture of 176.7 grams (3 moles) of allyl alcohol which had been dried by distillation, and 60 grams (1 mole) of glacial acetic acid were added dropwise over a period of one hour and 40 minutes. During the addition, the silicon tetrachloride mixture was agitated thoroughly. The mixture was allowed to stand overnight at room temperature, after which it was heated on a hot water bath at a temperature of 75° C. for 2 hours and 40 minutes and subsequently, was further heated on a steam bath for 2 hours and 25 minutes. The volatile materials were again distilled off under reduced pressure (10 millimeters absolute) on the steam bath. A residue weighing 104.3 grams was obtained and was determined to have a silicon dioxide content of 45.98 percent by weight. From this value it was calculated that the allyloxy to silicon ratio was 1.43 to 1. This mixture could be polymerized in the presence of benzoyl peroxide or other catalysts of addendum reaction and by the application of heat to provide a hard, resinous body.

Example VI

This example further illustrates the preparation of a polysiloxane ester of an unsaturated monohydric alcohol containing a $>C=CH_2$ group. The apparatus comprised a 1-liter, 3-necked flask having a dropping funnel, a rubber sealed stirrer and a reflux condenser. The reaction mixture comprised 340 grams (2 moles) of silicon tetrachloride which was introduced into the vessel after which the latter was placed in the ice water bath and a mixture of 383.5 grams (6.6 moles) of distilled allyl alcohol and 96 grams (1.6 moles) of glacial acetic acid was added dropwise. The mixture was heated in a hot water bath at 80° C. for 5 hours, during which time a dried, inert gas was bubbled through the mixture to sweep out evolved hydrogen chloride. The mixture was then heated on a steam bath for 8 hours, at the conclusion of which time the volatile materials were distilled off until a pressure of 10 millimeters (absolute) was attained on a steam bath. The residue weighed 305 grams and had an $SiO_2$ content of 37.8 percent. It was calculated from this value that the allyloxy to silicon ratio was 2 to 1.

In the foregoing examples, the ratio of alkoxy or allyloxy groups to silicon can be changed, for example, by reducing the ratio of acetic acid and increasing the ratio of alcohol in the reaction mixture. Also the ratio of alkoxy or allyloxy groups to silicon can be increased by reducing the temperature or sweeping out the evolved hydrogen chloride of the reaction more thoroughly during the preliminary stages of the reaction.

Example VII

This example illustrates the preparation of a butoxypolysiloxane having a butoxyl to silicon ratio of 2 to 1. A mixture of 2346 grams (31.6 moles) of n-butanol and 498.7 grams (8.3 moles) of glacial acetic acid was slowly added (2 hours) by means of a dropping funnel to 1700 grams (10 moles) of silicon tetrachloride in a 5-liter, round bottom 3-neck flask equipped with a rubber sealed stirrer and reflux condenser. The flask was disposed in an ice bath. The reaction mixture was stirred during the addition and subsequent operations. After the addition was completed, the mixture was heated on a steam bath for 4 hours. Following this the mixture was refluxed for 5 hours. Volatile materials were then removed by vacuum distillation at 10 mm. (absolute) pressure, up to a pot temperature of 190° C. The residue was found by analysis to contain 31.3 percent $SiO_2$. From this the butoxyl to silicon ratio was calculated to be 2.0 to 1.

Example VIII

This example illustrates the preparation of a polymer of allyloxypolysiloxane; 10 grams of allyloxypolysiloxane prepared in accordance with Example V, was catalyzed with 0.2 gram of tertiary butyl perbenzoate and the mixture was heated at 100° C. for 22 hours. The resulting product was very hard and clear. Other catalysts may be substituted for tertiary butyl perbenzoate. Coatings of the polymer on wood or metal may be so hardened.

As an alternate mode of procedure, apply actinic irradiation with, or without addition of a catalyst, to a film of allyloxypolysiloxane until a desired degree of hardness is obtained.

Fibers such as wood flour, glass fibers and the like may be incorporated with the allyloxypolysiloxane.

The forms of the invention herein shown and described are given by way of illustration or example. It will be apparent to those skilled in the art that many modifications may be made therein without departure from the scope of the invention as defined in the appended claims.

We claim:

1. A method of preparing a polysiloxane which comprises reacting as sole added reactants a mixture of: (A) about 1 mole of silicon tetrachloride; (B) about 3 moles of an alcohol of a class consisting of: methyl alcohol, ethyl alcohol, n-propyl alcohol, n-butyl alcohol, n-amyl alcohol, n-octyl alcohol, allyl alcohol, methallyl alcohol, with (C) about 1 mole of an acid free of water and being of a class consisting of: acetic acid, propionic acid, butyric acid, acrylic acid, methacrylic acid; removing the evolved hydrogen chloride substantially as it is formed and subsequently distilling off volatile reaction products contained in the reaction mixture.

2. A method of preparing butoxypolysiloxane which comprises forming a mixture the sole added reactants of which are about 1 mole of silicon tetrachloride and about 3 moles of normal butyl alcohol and about 1 mole of glacial acetic acid, removing the evolved hydrogen chloride substantially as it is formed and subsequently distilling off volatile reaction products contained in the reaction mixture.

3. In a method of preparing allyloxypolysiloxane, the steps of concurrently reacting as the sole added reactants about 1 mole of silicon tetrachloride, about 3 moles of allyl alcohol and about 1 mole of glacial acetic acid and removing hydrogen chloride substantially as it is formed.

References Cited in the file of this patent

UNITED STATES PATENTS

| 2,438,520 | Robie et al. | Mar. 30, 1948 |
| 2,490,691 | Langkammerer | Dec. 6, 1949 |

OTHER REFERENCES

Peppard et al., J. Am. Chem. Soc., vol. 68, January 1946, pp. 73–75.

Kreskov: J. Gen. Chem., U. S. S. R., vol. 17, pp. 81 to 86 (1947); translation available in Division 50 in "Dow Corning" Organo-Silicon Literature, vol. 5, article 37.

Kreskov et al.: J. Gen. Chem., U. S. S. R., vol. 19, pp. 660 to 663 (1949); translation available in Division 50 in "Dow Corning" Organo-Silicon Literature, vol. 5, article 51.